United States Patent
Uchino et al.

(10) Patent No.: US 9,906,976 B2
(45) Date of Patent: Feb. 27, 2018

(54) MOBILE STATION AND RADIO BASE STATION

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP); Kohei Kiyoshima, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 4 days.

(21) Appl. No.: 14/784,682

(22) PCT Filed: Mar. 20, 2014

(86) PCT No.: PCT/JP2014/057795
§ 371 (c)(1),
(2) Date: Oct. 15, 2015

(87) PCT Pub. No.: WO2014/171259
PCT Pub. Date: Oct. 23, 2014

(65) Prior Publication Data
US 2016/0057650 A1    Feb. 25, 2016

(30) Foreign Application Priority Data
Apr. 18, 2013   (JP) .................................. 2013-087720

(51) Int. Cl.
*G01R 31/08*     (2006.01)
*H04W 28/02*    (2009.01)
(Continued)

(52) U.S. Cl.
CPC ..... *H04W 28/0278* (2013.01); *H04L 47/6275* (2013.01); *H04W 28/0205* (2013.01);
(Continued)

(58) Field of Classification Search
CPC .................................................. H04W 28/0278
See application file for complete search history.

(56) References Cited

U.S. PATENT DOCUMENTS 8,462,688 B1 *  6/2013  Dinan ................. H04W 72/005
                                                                    370/312
9,603,128 B2 *  3/2017  Moulsley .......... H04W 72/0413
(Continued)

FOREIGN PATENT DOCUMENTS

| EP | 2524561 B1 | 11/2014 |
|----|------------|---------|
| WO | 2010/131884 A2 | 11/2010 |
| WO | 2011/123549 A1 | 10/2011 |

OTHER PUBLICATIONS

Office Action issued in the counterpart European Patent Application No. 14785882.3, dated Aug. 5, 2016 (12 pages).
(Continued)

*Primary Examiner* — Gerald Smarth
(74) *Attorney, Agent, or Firm* — Osha Liang LLP (57) ABSTRACT

A mobile station UE notifies a radio base station of a total amount of data accumulated in a buffer with granularity finer than an LCG. A mobile station UE according to the present invention includes: a management unit 11 configured to manage LCGs and manage DFGs each of which is a group of one or more priorities assigned to one or more data flows; and a transmission unit 13 configured to notify a radio base station eNB of a total amount of data remaining in a buffer for each of combinations of the LCGs and DFGs.

5 Claims, 10 Drawing Sheets (51) Int. Cl.
  *H04W 72/12* (2009.01)
  *H04W 28/10* (2009.01)
  *H04L 12/865* (2013.01)
  *H04L 12/801* (2013.01)
  *H04L 12/851* (2013.01)
  *H04L 12/835* (2013.01)

(52) U.S. Cl.
  CPC ....... *H04W 28/10* (2013.01); *H04W 72/1284* (2013.01); *H04L 47/12* (2013.01); *H04L 47/14* (2013.01); *H04L 47/2433* (2013.01); *H04L 47/2441* (2013.01); *H04L 47/30* (2013.01)

(56) References Cited

U.S. PATENT DOCUMENTS

| | | | |
|---|---|---|---|
| 2007/0201369 A1 | 8/2007 | Pedersen et al. | |
| 2009/0080380 A1* | 3/2009 | Chun | H04W 28/06 370/329 |
| 2009/0113086 A1 | 4/2009 | Wu et al. | |
| 2011/0261747 A1 | 10/2011 | Wang et al. | |
| 2012/0113922 A1 | 5/2012 | Kim et al. | |
| 2013/0188473 A1* | 7/2013 | Dinan | H04W 56/0005 370/216 |

OTHER PUBLICATIONS

International Search Report issued in PCT/JP2014/057795 dated Jun. 17, 2014 (2 pages).
Written Opinion of the International Searching Authority issued in PCT/JP2014/057795 dated Jun. 17, 2014 (3 pages).
Nokia; "Buffer Reporting for E-UTRAN"; 3GPP TSG-RAN WG2 Meeting #52, R2-060829; Athens Greece; Mar. 27-31, 2006 (5 pages)
3GPP TS 36.321 V11.2.0; "3rd Generation Partnership Project; Technical Specification Group Radio Access Network; Evolved Universal Terrestrial Radio Access (E-UTRA); Medium Access Control (MAC) protocol specification (Release 11)"; Mar. 2013 (56 pages).
Telecom Italia et al.; "Views on RAN User Plane congestion mitigation"; SA WG2 Meeting #95, S2-130060; Prague, Czech Republic; Jan. 28-Feb. 1, 2013 (6 pages).
Office Action issued in the counterpart European Patent Application No. 14785882.3, dated Jul. 13, 2017 (7 pages).

* cited by examiner

MOBILE STATION AND RADIO BASE STATION

TECHNICAL FIELD

The present invention relates to a mobile station and a radio base station.

BACKGROUND ART

LTE (Long Term Evolution) specifies that a mobile station UE is to execute the following procedure when uplink data to be transmitted occurs (see Non-patent document 1).

In Step 1, the mobile station UE transmits a scheduling request signal to a radio base station eNB.

Figure 10:
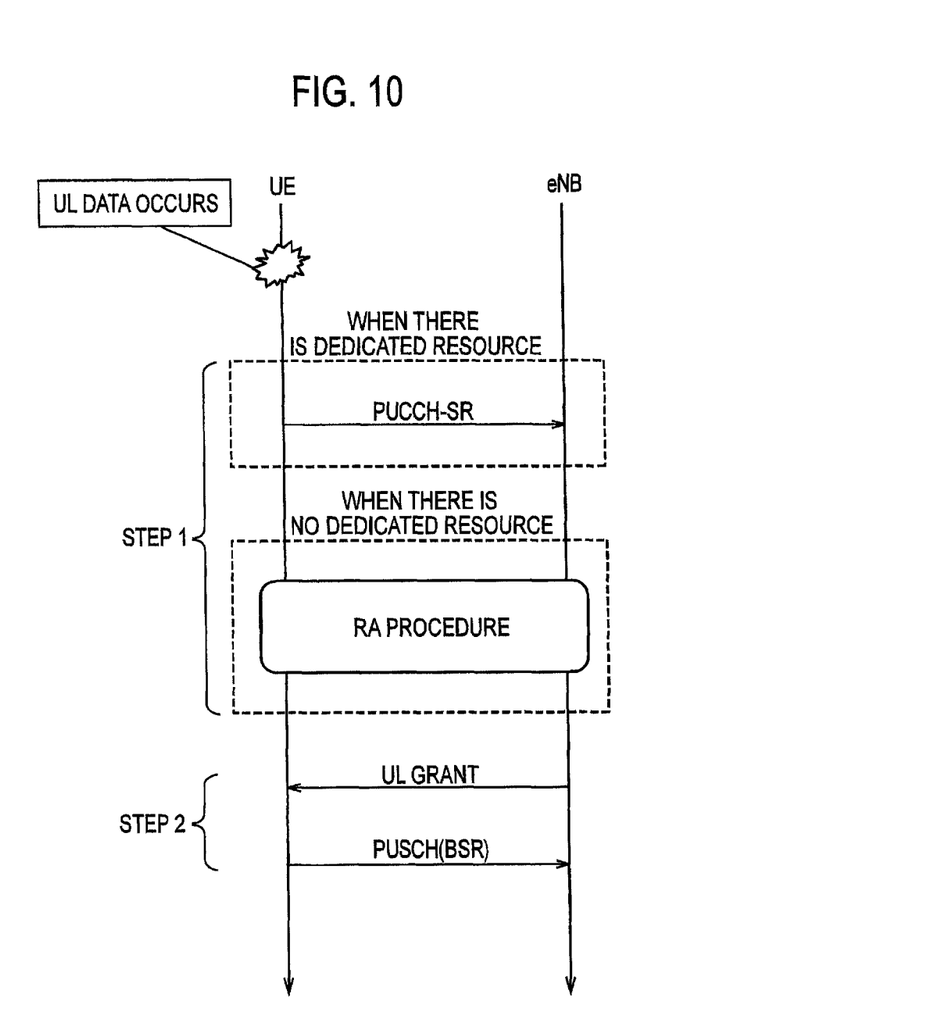
FIG. 10 is a diagram for explaining a related art.

As illustrated in FIG. 10, if the mobile station UE has a dedicated uplink resource (PUCCH-scheduling request), the mobile station UE transmits a scheduling request signal to the radio base station eNB using the uplink resource.

On the other hand, if the mobile station UE has no dedicated uplink resource, the mobile station UE executes an RA (Random Access) procedure.

In Step 2, the mobile station UE transmits a BSR (Buffer Status Report) to the radio base station eNB.

As illustrated in FIG. 10, the mobile station UE transmits a BSR to the ratio base station eNB via a PUSCH (Physical Uplink Shared Channel) corresponding to a "UL grant" assigned in Step 1.

Note that a "UL grant" is allocated to the mobile station UE by an "RA response" when the RA procedure is executed.

Figure 11:
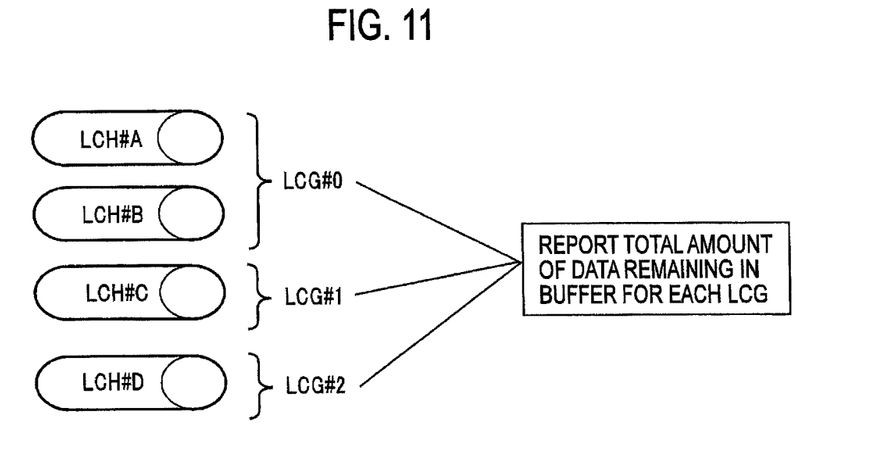
FIG. 11 is a diagram for explaining the related art.

As illustrated in FIG. 11, for each LCG (Logical Channel Group) including an LCH (Logical Channel) in which data to be transmitted is accumulated in a buffer, the mobile station UE is configured to use a BSR to report a total amount of the data accumulated.

In an example of FIG. 11, the mobile station UE reports a total amount of data accumulated in a buffer not for each of LCHs #A to #D but for each of LCGs #0 to #2.

Meanwhile, in LTE Release 12, a study on avoiding radio access network congestion due to U-plane signals is made in the "UPCON (U-Plane Congestion Management) WI (Working Item)."

Lately, services provided even on the same web browser are a mixture of texts, images, motion videos, streaming media, and the like.

Under the above circumstances, if radio access network congestion occurs, there is a demand to transmit streaming media, texts, images, motion videos in this order, for example. In addition to a QCI, the "UPCON WI" defines an "FPI (Flow Priority Indicator)" indicating the priority of each data flow (IP flow) for more detailed priority control, and discusses solving means for (a scheduler of) the radio base station eNB to carry out the QoS control and priority control using the FPI (see Non-patent document 2).

PRIOR ART DOCUMENT

Non-Patent Document

Non-patent document 1: 3GPP TS36.321
Non-patent document 2: 3GPP specification S2-130060

SUMMARY OF THE INVENTION

However, in the current LTE, the mobile station UE cannot report a total amount of data accumulated in a buffer on a per-FPI basis.

Figure 12:
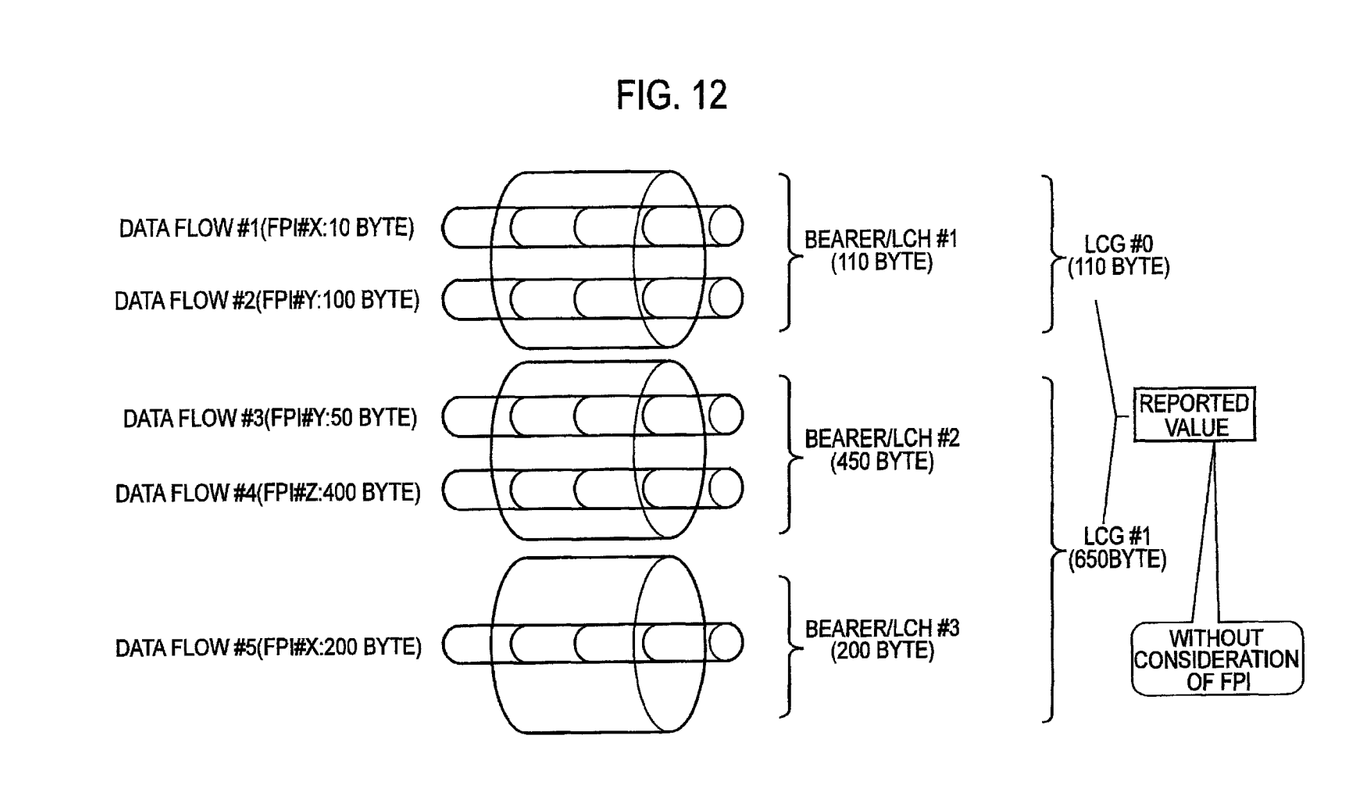
FIG. 12 is a diagram for explaining the related art.

As illustrated in FIG. 12, even when a data flow having an FPI #X and a data flow having an FPI #Y exist in an LCH (bearer) #1, a data flow having the FPI #Y and a data flow having an FPI #Z exist in an LCH (bearer) #2, and a data flow having the FPI #X exists in an LCH (bearer) #3, the mobile station UE merely reports a total amount of data accumulated in a buffer for each of the LCGs #1 to #3 without consideration of the FPIs #X to #z.

Basically, in the case of congestion, there is a demand that the radio base station eNB should schedule data with a high priority early, suspend scheduling of data with a low priority, and schedule the data with the low priority after the congestion is resolved.

However, the current LTE has problems in that the radio base station eNB cannot schedule data assigned a high-priority FPI early, and in that there is a possibility that data assigned a low-priority FPI may be unnecessarily scheduled so early that other data assigned a high-priority FPI may be delayed.

The present invention has been therefore made in view of the above problems, and an objective thereof is to provide a mobile station and a radio base station by which the mobile station can notify the radio base station of a total amount of data accumulated in a buffer with granularity finer than an LCG.

A first feature of the present invention is summarized as a mobile station including: a management unit configured to manage a logical channel group and a priority group which is a group of one or more priorities assigned to one or more data flows; and a transmission unit configured to notify a radio base station of a total amount of data remaining in a buffer for each combination of the logical channel group and the priority group.

A second feature of the present invention is summarized as a mobile station including: a management unit configured to manage a logical channel group and manage a priority group which is a group of one or more priorities assigned to one or more data flows; and a transmission unit configured to notify a radio base station of a total amount of data remaining in a buffer for the priority group by use of an area of a buffer status report, the area providing notification of a total amount of data remaining in a buffer for a certain logical channel group.

A third feature of the present invention is summarized as a mobile station including: a management unit configured to manage priority groups each of which is a group of one or more priorities assigned to one or more data flows; and a transmission unit configured to notify a radio base station of a total amount of data remaining in a buffer for a certain priority group. Here, even if data is remaining in a buffer for a priority group other than the certain priority group, the transmission unit provides notification that the data is remaining in the buffer for the priority group other than the certain priority group, without providing notification of a total amount of data remaining in the buffer for the other priority group.

A fourth feature of the present invention is summarized as a radio base station including a transmission unit configured to give an instruction to a mobile station capable of providing notification of a total amount of data remaining in a buffer for each of priority groups each of which is a group of one or more priorities assigned to one or more data flows, the instruction instructing the mobile station to, even if data is remaining in a buffer for a priority group other than a certain priority group, provide notification that the data is remaining in the buffer for the priority group other than the certain priority group, without providing notification of a total amount of the data remaining in the buffer for the other priority group.

DETAILED DESCRIPTION (Mobile Communication System According to First Embodiment of Present Invention)

A mobile communication system according to a first embodiment of the present invention will be described with reference to FIGS. 1 to 5.

Figure 1:
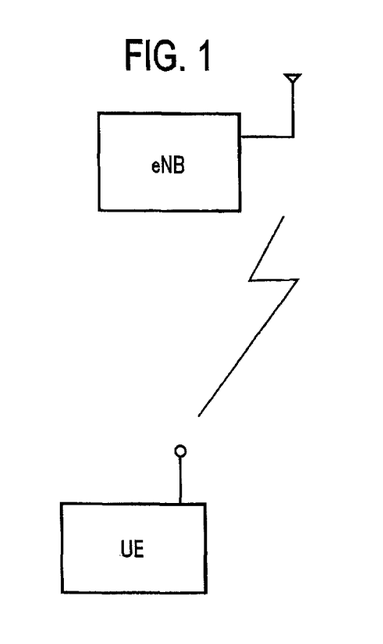
FIG. 1 is an overall configuration diagram of a mobile communication system according to a first embodiment of the present invention.

As illustrated in FIG. 1, the mobile communication system according to the present embodiment is an LTE mobile communication system, and includes a radio base station eNB and a mobile station UE. Note that the mobile communication system according to the present embodiment is configured to be capable of using the FPIs described above.

Figure 2:
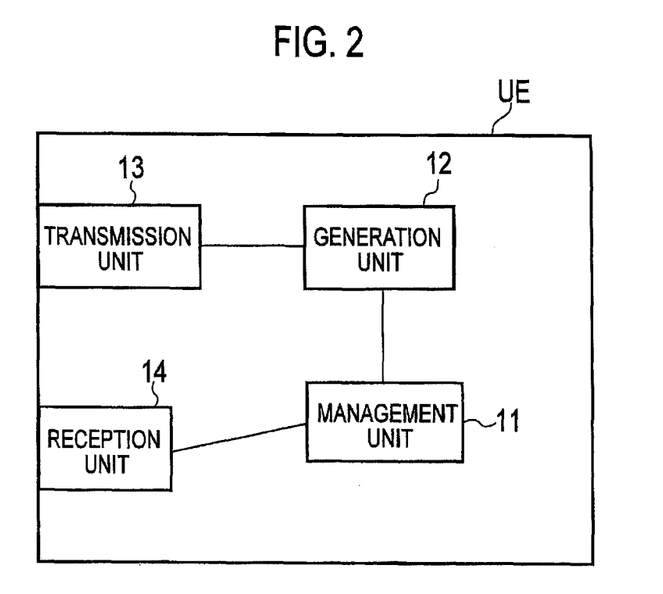
FIG. 2 is a functional block diagram of a mobile station UE according to the first embodiment of the present invention.

As illustrated in FIG. 2, the mobile station UE according to the present embodiment includes a management unit 11, a generation unit 12, a transmission unit 13, and a reception unit 14.

The management unit 11 is configured to manage LCGs, DFGs (Data Flow Groups), and the like.

Here, each of the DFGs is a group including one or more FPIs. Each FPI belongs to any one of the DFGs.

Note that the management unit 11 decides which DFG each FPI is to belong to, according to an instruction from the radio base station eNB.

The generation unit 12 is configured to generate a BSR to be transmitted to the radio base station eNB.

For example, the generation unit 12 generates a BSR for providing notification of a total amount of data remaining in a buffer for each of combinations of the LCGs and DFGs.

Here, data in a data flow for which no FPI is notified may be mapped on a specific DFG (DFG of the lowest priority, for example).

The transmission unit 13 is configured to transmit various signals to the radio base station eNB, and the reception unit 14 is configured to receive various signals from the radio base station eNB.

Here, the transmission unit 13 sends the radio base station eNB a BSR generated by the generation unit 12.

Figure 3:
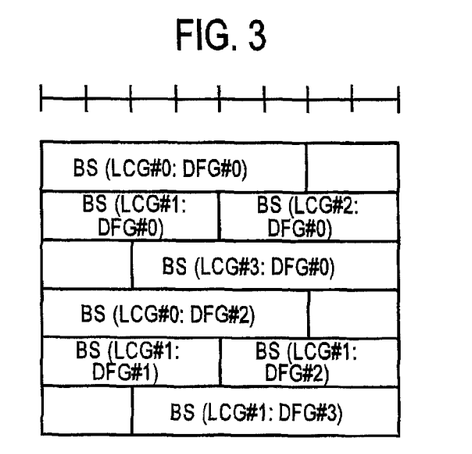
FIG. 3 is a diagram illustrating an example of a format of a BSR to be transmitted by the mobile station UE according to the first embodiment of the present invention.

For example, an example of a format of the BSR is illustrated in FIG. 3. As illustrated in FIG. 3, the BSR provides notification of a total amount of data remaining in a buffer for each of combinations of the LCGs and DFGs.

In the example of FIG. 3, the BSR provides notification of a total amount of data remaining in a buffer for a combination of an LCG #0 and a DFG #0, a total amount of data remaining in a buffer for a combination of an LCG #1 and the DFG #0, a total amount of data remaining in a buffer for a combination of an LCG #2 and the DFG #0, a total amount of data remaining in a buffer for a combination of an LCG #3 and the DFG #0, a total amount of data remaining in a buffer for a combination of the LCG #0 and a DFG #2, a total amount of data remaining in a buffer for a combination of the LCG #1 and a DFG #1, a total amount of data remaining in a buffer for a combination of the LCG #1 and the DFG #2, and a total amount of data remaining in a buffer for a combination of the LCG #1 and a DFG #3.

Figure 4:
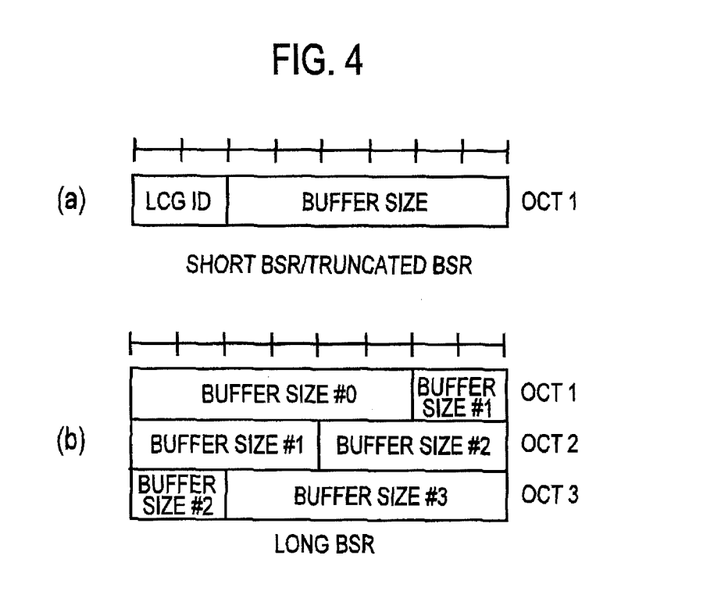
FIG. 4 is a diagram illustrating an example of a format of a BSR to be transmitted by a conventional mobile station UE.

On the other hand, as illustrated in FIG. 4(a) and FIG. 4(b), an existing BSR provides notification of a total amount of data remaining in a buffer for each LCG.

Note that, in the example of FIG. 4(b), the BSR provides notification of a total amount of data remaining in a buffer for an LCG #0 (Buffer Size #0), a total amount of data remaining in a buffer for an LCG #1 (Buffer Size #1), a total amount of data remaining in a buffer for an LCG #2 (Buffer Size #2), and a total amount of data remaining in a buffer for an LOG #3 (Buffer Size #3).

Hereinbelow, with reference to FIG. 5, a description is given of an operation of the mobile communication system according to the present embodiment, and specifically of an operation of the mobile station UE according to the present embodiment.

Figure 5:
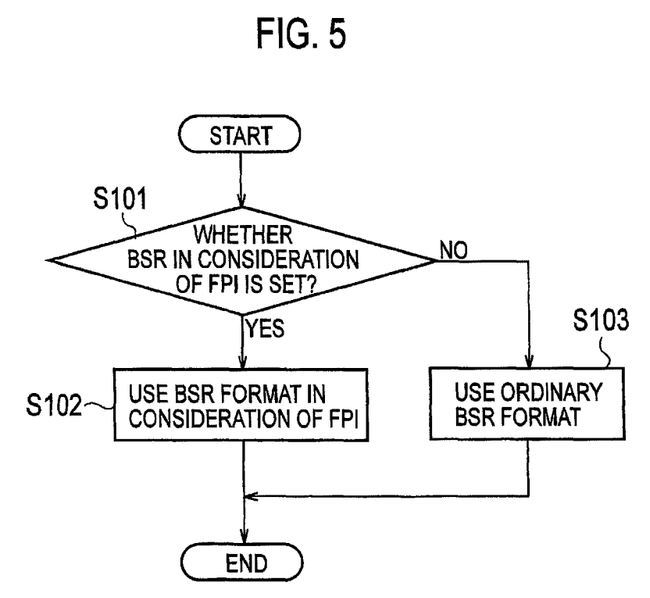
FIG. 5 is a flowchart illustrating an operation of the mobile station UE according to the first embodiment of the present invention.

As illustrated in FIG. 5, in Step S101, the mobile station UE judges whether or not there is an instruction to report a BSR taking into consideration of FPIs.

The operation advances to Step S102 if it is judged that there is an instruction to report a BSR taking into consideration of FPIs, and the operation advances to Step S103 if it is judged that there is no instruction to report a BSR taking into consideration of FPIs.

In Step S102, the mobile station UE generates a BSR taking into consideration of FPIs, i.e., a BSR for providing notification of a total amount of data remaining in a buffer for each of combinations of the LCGs and DFGs.

On the other hand, in Step S103, the mobile station UE generates an ordinary BSR without consideration of FPIs, i.e., a BSR for providing notification of a total amount of data remaining in a buffer for each LCG.

Modified Example 1

Figure 6:
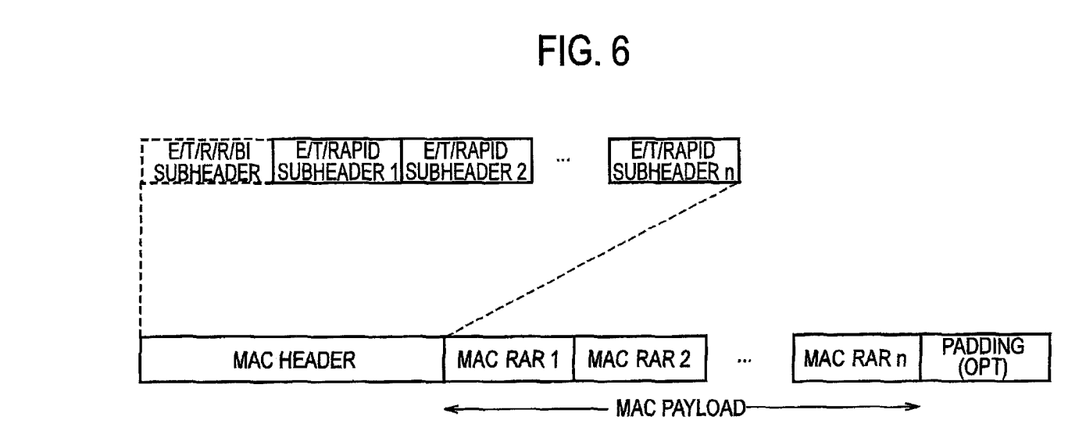
FIG. 6 is a diagram illustrating an example of a format of a BSR to be transmitted by a mobile station UE according to modified example 1 of the present invention.

Hereinbelow, with reference to FIG. 6, a mobile communication system according to modified example 1 of the present invention will be described in terms of differences from the mobile communication system according to the first embodiment described above.

Unlike that of the mobile communication system according to the first embodiment, a transmission unit 13 of a mobile station UE of the mobile communication system according to the modified example 1 is configured to provide notification of a total amount of data remaining in a buffer for each of combinations of the LCGs and DFGs, not using the new BSR format (see FIG. 3) but using an existing BSR format (see FIG. 6) as it is.

The existing BSR has a format for providing notification of a total amount of data remaining in a buffer for each LCG.

For example, the transmission unit 13 may notify the radio base station eNB of a total amount of data remaining in a buffer for a DFG (e.g., DFG #0) by use of an area, of the BSR, for providing notification of a total amount of data remaining in a buffer for a specified LCG (e.g., LCG #0).

Here, an LCID (Logical Channel ID) included in each "subheader" of a "MAC header" may be used to provide notification of which DFG the total amount of data remaining in the buffer thus reported corresponds to.

For example, the mapping of the DFG on the LCID may be notified by the radio base station eNB, and the DFG mapped on the LCID may be represented with 2 bits of LSB of the LCID.

Modified Example 2

Hereinbelow, with reference to FIGS. 7 to 9, a mobile communication system according to modified example 2 of the present invention will be described in terms of differences from the mobile communication system according to the first embodiment described above.

Figure 7:
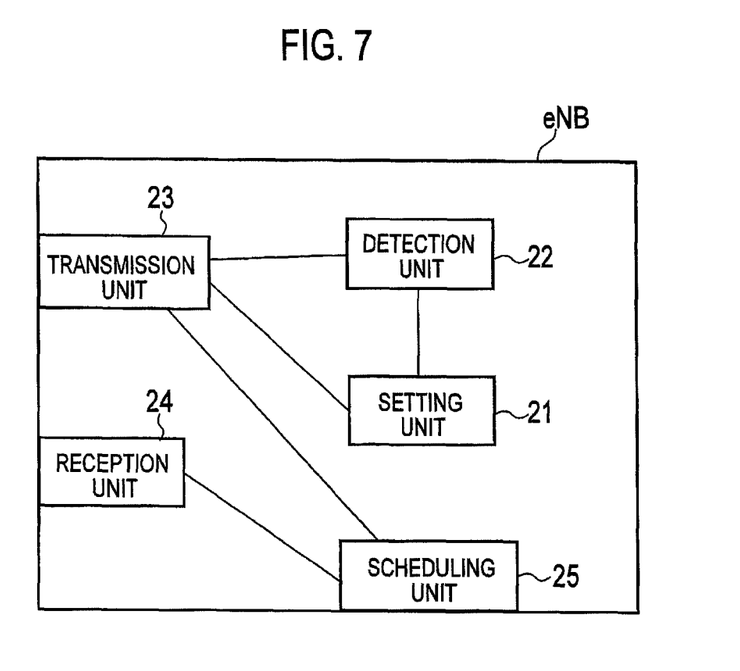
FIG. 7 is a functional block diagram of a radio base station eNB according to modified example 2 of the present invention.

As illustrated in FIG. 7, a radio base station eNB according to the modified example 2 includes a setting unit 21, a detection unit 22, a transmission unit 23, a reception unit 24, and a scheduling unit 25.

The setting unit 21 is configured to set a "BSRprohibit function" of each DFG at either "ON" or "OFF."

Note that the setting unit 21 sets a value of a "BSRprohibit timer" for DFGs whose "BSRprohibit function" is set at "ON."

Here, the setting unit 21 may be capable of setting a value of the "BSRprohibit timer" on per-DFG basis.

For example, when each DFG is assigned a priority in the mobile communication system according to the modified example 2, the setting unit 21 may set the "BSRprohibit function" of each DFG assigned any of a high priority and a middle priority at "OFF" and set the "BSRprohibit function" of each DFG assigned a low priority at "ON."

The detection unit 22 is configured to detect occurrence of congestion in the radio base station eNB.

Here, the setting unit 21 may set the "BSRprohibit function" of one or more specific DFGs at "ON" when the detection unit 22 detects occurrence of congestion in the radio base station eNB.

The transmission unit 23 is configured to transmit various signals to the mobile station UE, and the reception unit 24 is configured to receive various signals from the mobile station UE.

Here, even if data is remaining in a buffer for a DFG whose "BSRprohibit function" is set at "ON," the transmission unit 23 instructs the mobile station UE not to provide notification of a total amount of the data remaining in the buffer for such DFG, but to provide notification that the data is remaining in the buffer.

In addition, the transmission unit 23 gives the above instruction to the mobile station UE by transmitting a signal for changing the status of the "BSRprohibit function" of one or more specific DFGs to "ON", that is, a signal for activating the "BSRprohibit function" of the specific DFGs.

Such a signal may be transmitted via a dedicated signal (e.g., MAC-CE) or may be transmitted via a broadcast signal.

Alternatively, the transmission unit 23 may send the mobile station UE a signal for changing the status of the "BSRprohibit function" of one or more specific DFGs to "OFF", that is, a signal for deactivating the "BSRprohibit function" of the specific DFGs.

Further, at a predetermined timing, the transmission unit 23 notifies the mobile station UE of a value of the "BSRprohibit timer" set for each DFG.

Note that the transmission unit 23 may instruct the mobile station UE to change the status of the "BSRprohibit function" of one or more specific DFGs to "OFF" by notifying the mobile station UE of "0" as the value of the "BSRprohibit timer" set for each specific DFG.

Furthermore, the reception unit 24 is configured to receive, from the mobile station UE, a BSR and a notification that data is remaining in a buffer for a DFG whose "BSRprohibit function" is set at "ON".

The scheduling unit 25 is configured to perform scheduling assignments of the mobile station UE with reference to the BSR and the notification received by the reception unit 24.

Note that the transmission unit 23 sends the mobile station UE a scheduling signal generated based on a result of the scheduling carried out by the scheduling unit 25.

In the mobile station UE according to the modified example 2, the transmission unit 13 notifies, with a BSR, the radio base station eNB of a total amount of data remaining in a buffer for each DFG whose "BSRprohibit function" is set at "OFF."

In the meantime, in the mobile station UE according to the modified example 2, even if data is remaining in a buffer for a DFG whose "BSRprohibit function" is set at "ON" and whose "BSRprohibit timer" is running, the transmission unit 13 notifies, with a BSR, the radio base station eNB of the fact that the data is remaining in the buffer for such DFG instead of a total amount of data remaining in the buffer.

Note that, in the mobile station UE according to the modified example 2, the transmission unit 13 may notify, with a BSR, the radio base station eNB of a total amount of data remaining in a buffer for each DFG whose "BSRprohibit function" is set at "ON" and whose "BSRprohibit timer" is not running.

Specifically, in the mobile station UE according to the modified example 2, the transmission unit 13 starts a "BSRprohibit timer" set for a specific DFG in response to an event where the reception unit 14 receives, from the radio base station eNB, a signal for changing the status of the "BSRprohibit function" of the DFG to "ON."

Then, once the "BSRprohibit timer" expires, the transmission unit 13 provides, with a BSR, notification of a total amount of data remaining in a buffer for the DFG for which the "BSRprohibit timer" is set, and then restarts the "BSRprohibit timer."

Note that, if MAC-ACK for the BSR cannot be confirmed, the transmission unit 13 may again provide, with a BSR, notification of the total amount of data remaining in the buffer for the DFG for which the "BSRprohibit timer" is set.

In addition, in the mobile station UE according to the modified example 2, the transmission unit 13 sends the radio base station an uplink signal according to a scheduling signal ("UL grant") received by the reception unit 14.

For example, if there is enough room in a resource assigned via the "UL grant", the transmission unit 13 puts, in a single MAC-PDU, not only a MAC-SDU in a data flow having an FPI which belongs to a DFG assigned any of a high priority and a middle priority but also a MAC-SDU in a data flow having an FPI which belongs to a DFG assigned a low priority.

Note that, as to an "RLC control PDU" and a "PDCP control PDU", the transmission unit 13 may notify, with a BSR, the radio base station eNB of a total amount of data remaining in a buffer for each DFG whose "BSRprohibit function" is set at "ON" and whose "BSRprohibit timer" is running.

Hereinbelow, an operation of the mobile communication system according to the modified example 2 will be described with reference to FIGS. 8 and 9.

First, an example of the operation of the mobile communication system according to the modified example 2 will be described with reference to FIG. 8.

Figure 8:
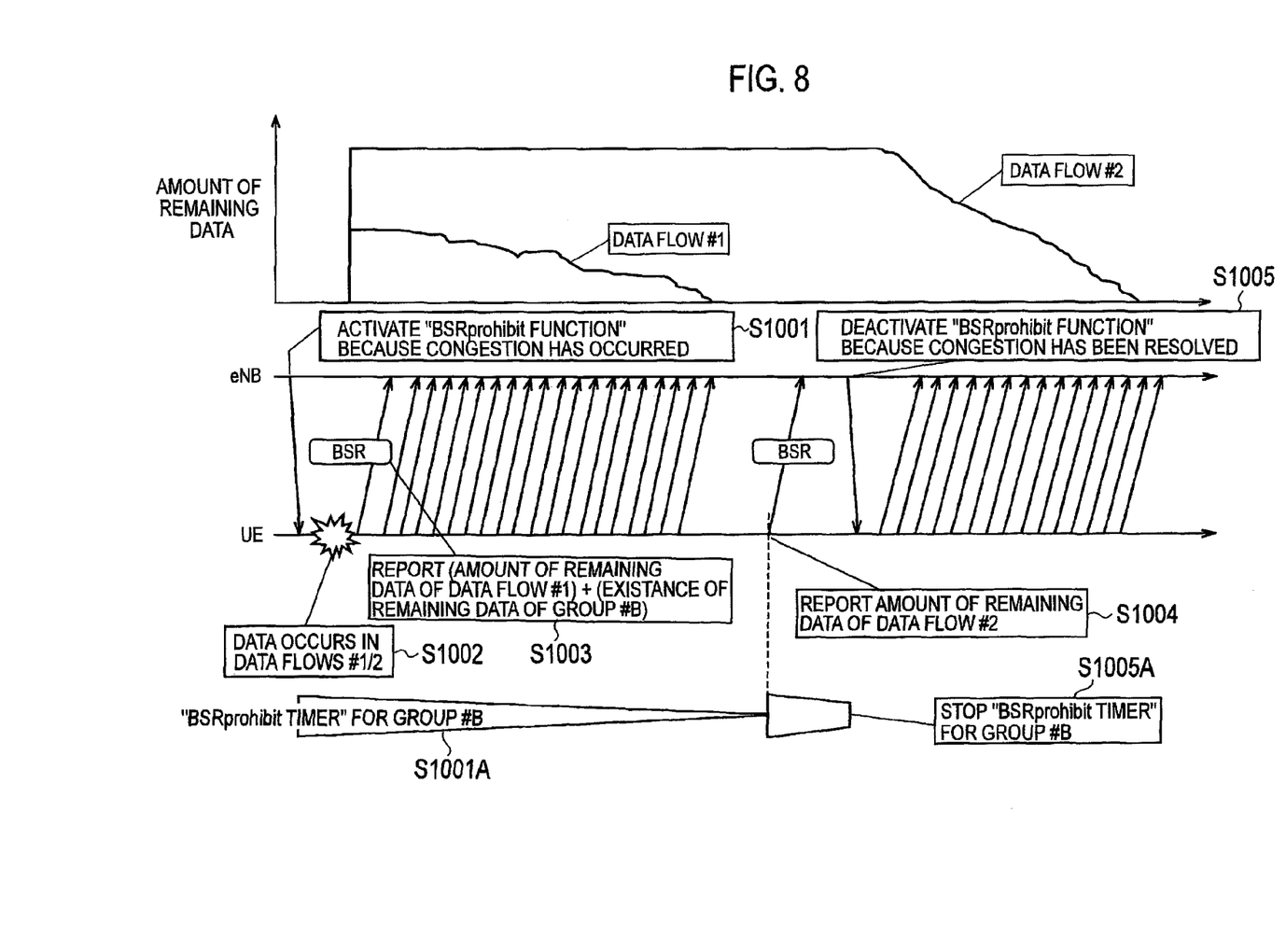
FIG. 8 is a diagram for explaining an operation of a mobile communication system according to the modified example 2 of the present invention.

In the example of FIG. 8, an FPI #1 set for a data flow #1 belongs to a DFG #A assigned a high priority, and an FPI #2 set for a data flow #2 belongs to a DFG #B assigned a low priority.

As illustrated in FIG. 8, in Step S1001, upon detecting occurrence of congestion, the radio base station eNB sends the mobile station UE a signal for setting the "BSRprohibit function" of the DFG #B assigned a low priority at "ON."

Upon receiving this signal, the mobile station UE sets the "BSRprohibit function" of the DFG #B at "ON" and, in Step S1001A, starts a "BSRprohibit timer" set for the DFG #B.

Upon detecting occurrence of data to be transmitted in the data flow #1 and data flow #2 in Step S1002, in Step S1003 the mobile station UE notifies, with a BSR, the radio base station eNB of a total amount of data remaining in a buffer for the DFG #A (buffer for the data flow #1 in the example of FIG. 8), and of the fact that data is remaining in a buffer for the DFG #B (buffer for the data flow #2 in the example of FIG. 8).

Here, the radio base station eNB performs scheduling assignments, with reference to the BSR, so as to give priority to transmission of data in the data flow #1.

In Step S1004, once the "BSRprohibit timer" set for the DFG #2 expires, the mobile station UE notifies, with a BSR, the radio base station eNB of the total amount of data remaining in the buffer for the DFG #A (buffer for the data flow #1 in the example of FIG. 8), and of a total amount of data remaining in the buffer for the DFG #B (buffer for the data flow #2 in the example of FIG. 8).

In Step S1005, the radio base station eNB sends the mobile station UE a signal for setting the "BSRprohibit function" of the DFG #B at "OFF" upon detecting that the congestion has been resolved.

Upon receiving this signal, the mobile station UE sets the "BSRprohibit function" of the DFG #B at "OFF" and, in Step S1005A, stops the "BSRprohibit timer" set for the DFG #B.

Second, an operation of the mobile station UE according to the modified example 2 will be described with reference to FIG. 9.

Figure 9:
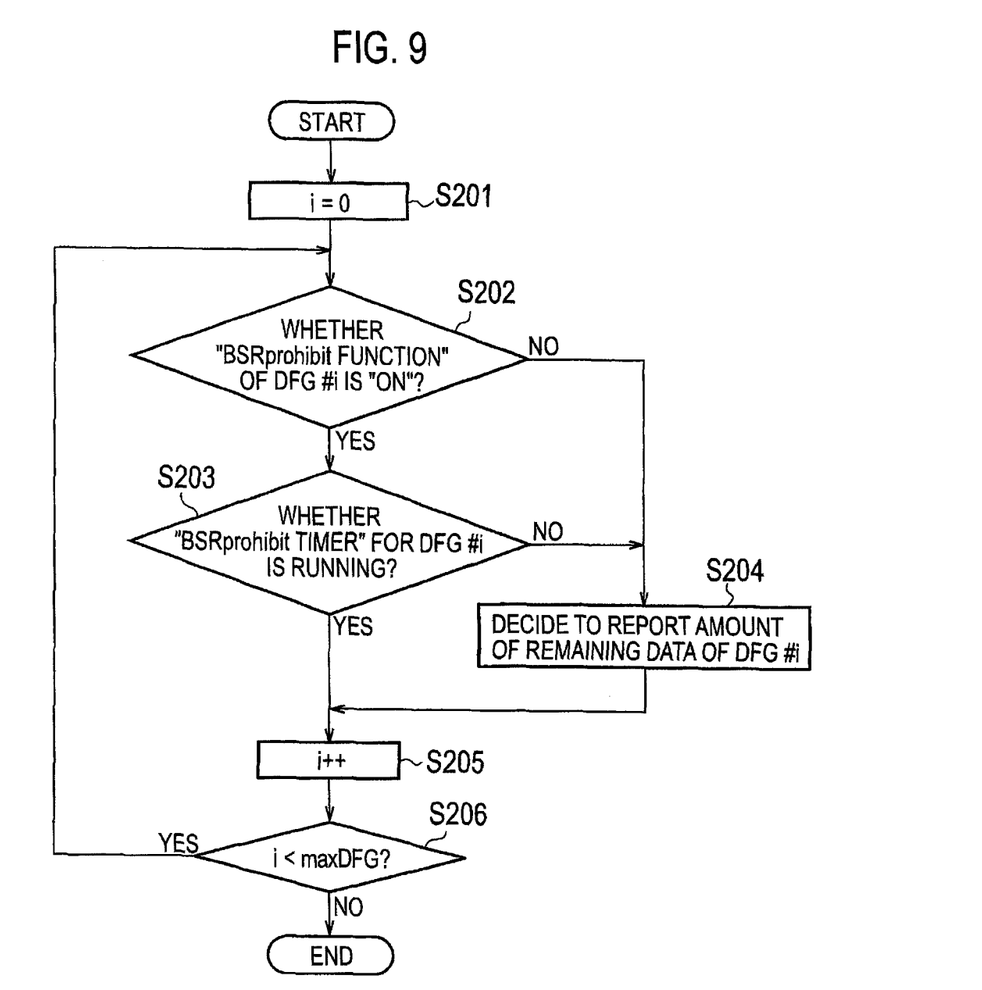
FIG. 9 is a flowchart illustrating an operation of a mobile station UE according to the modified example 2 of the present invention.

As illustrated in FIG. 9, the mobile station UE sets "i=0" in Step S201, and judges in Step S202 whether or not the "BSRprohibit function" of a DFG #i is set at "ON."

If "YES", the operation advances to Step S203. If "NO", the operation advances to Step S204.

In Step S203, the mobile station UE judges whether or not a "BSRprohibit timer" set for the DFG #i is running.

If "YES," the operation advances to Step S205. If "NO," the operation advances to Step S204.

In Step S204, the mobile station UE decides to notify the radio base station eNB of a total amount of data remaining in a buffer for the DFG #i.

The mobile station UE increments the value of "i" by 1 in Step S205, and judges whether or not "i<maxDFG (maximum value for DFG identification number)" is satisfied.

If "YES," the operation goes back to Step S202. If "NO," the operation is terminated.

The mobile station UE generates a BSR based on the decision made in the above operation. Specifically, the mobile station UE generates a BSR which provides notification of a total amount of data remaining in a buffer for each of DFGs # for which the notification of the total amount of data remaining in the buffer has been decided in Step S204, and provides notification that data is remaining in a buffer for each of DFGs other than the above DFGs #.

The features of the present embodiment may also be expressed as follows.

A first feature of the present embodiment is summarized as a mobile station UE including: a management unit 11 configured to manage an LCG (logical channel group) and manage a DFG (priority group) which is a group of one or more priorities assigned to one or more data flows; and a transmission unit 13 configured to notify a radio base station eNB of a total amount of data remaining in a buffer for each combination of the LCG and the DFG.

According to the above aspect, the mobile station UE can provide notification of a total amount of data remaining in a buffer for each of combinations of the LCGs and DFGs, and thus can notify the radio base station of a total amount of data accumulated in a buffer with granularity of FPI.

Accordingly, the radio base station eNB can schedule data assigned a high-priority FPI to be processed early, for example.

A second feature of the present embodiment is summarized as a mobile station UE including: a management unit 11 configured to manage an LCG and manage a DFG which is a group of one or more priorities assigned to one or more data flows; and a transmission unit 13 configured to notify a radio base station eNB of a total amount of data remaining in a buffer for the DFG by use of an area of a BSR (buffer status report), the area providing notification of a total amount of data remaining in a buffer for a certain LCG.

According to the above aspect, the mobile station UE can provide notification of a total amount of data remaining in a buffer for each of combinations of the LCGs and DFGs using an existing BSR format as it is.

A third feature of the present embodiment is summarized as a mobile station UE including: a management unit 11 configured to manage DFGs; and a transmission unit 13 configured to notify a radio base station eNB of a total amount of data remaining in a buffer for a certain DFG. Here, even if data is remaining in a buffer for a DFG other than the certain DFG, the transmission unit 13 provides notification that the data is remaining in the buffer for the DFG other than the certain DFG without providing notification of a total amount of data remaining in the buffer for the other DFG.

According to the above aspect, the radio base station eNB performs scheduling assignments only with information on a total amount of data remaining in a buffer for a specified DFG assigned a high priority (or a middle priority), and thus can preferentially transmits data in the buffer for the specified DFG.

In the third feature of the present embodiment, the certain DFG may be a DFG whose "BSRprohibit timer (predefined timer)" is not running.

According to the above aspect, the mobile station UE can even periodically notify the radio base station eNB of a total amount of data remaining in a buffer for a DFG assigned a low priority.

In the third feature of the present embodiment, the "BSR-prohibit timer" may be started in response to an instruction from the radio base station eNE.

According to the above aspect, the radio base station eNB can control the timing to report a total amount of data remaining in a buffer for each DFG assigned a low priority.

In the third feature of the present embodiment, a value of the "BSRprohibit timer" may be set independently for each of the DFGs.

The radio base station eNB can change the timing to report a total amount of data remaining in a buffer from one DFG assigned a low priority to another.

A fourth feature of the present embodiment is summarized as a radio base station eNB including a transmission unit 23 configured to give an instruction to a mobile station UE capable of providing notification of a total amount of data remaining in a buffer for each of DFGs, the instruction instructing the mobile station UE to, even if data is remaining in a buffer for a DFG other than a certain DFG, provide notification that the data is remaining in the buffer for the DFG other than the certain DFG, without providing notification of a total amount of the data remaining in the buffer for the other DFG.

According to the above aspect, the radio base station eNB performs scheduling assignments only with information on a total amount of data remaining in a buffer for a specified DFG assigned a high priority (or a middle priority), and thus can preferentially transmits data in the buffer for the specified DFG.

It should be noted that the foregoing operations of the mobile stations UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE and the radio base station eNB. Otherwise, the storage medium and the processor may be provided as discrete components inside the mobile stations UE and the radio base station eNB. Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-087720 (filed on Apr. 18, 2013) is incorporated by reference in the present specification.

INDUSTRIAL APPLICABILITY

As has been described the above, the present invention can provide a mobile station and a radio base station by which the mobile station can notify the radio base station of a total amount of data accumulated in a buffer with granularity finer than an LCG.

EXPLANATION OF THE REFERENCE NUMERALS eNB radio base station
UE mobile station
11 management unit
12 generation unit
13, 23 transmission unit
14, 24 reception unit
21 setting unit
22 detection unit
25 scheduling unit

The invention claimed is:

1. A mobile station comprising:
a processor that manages priority groups each of which is a group of one or more priorities assigned to one or more data flows; and
a transmitter that notifies a radio base station of a total amount of data remaining in a buffer for a certain priority group,
wherein when data is remaining in a buffer for a priority group other than the certain priority group, the transmitter provides notification that the data is remaining in the buffer for the priority group other than the certain priority group, without providing notification of a total amount of data remaining in the buffer for the other priority group,
wherein the certain priority group is a priority group whose Buffer Status Report prohibit timer is not running, and
wherein the Buffer Status Report prohibit timer is started in response to an instruction from the radio base station.

2. The mobile station according to claim 1, wherein a value of the Buffer Status Report prohibit timer is set independently for each of the priority groups.

3. A radio base station comprising:
a transmitter that transmits an instruction to a mobile station that provides notification of a total amount of data remaining in a buffer for each of priority groups which is a group of one or more priorities assigned to one or more data flows,
the instruction instructing the mobile station to, when data is remaining in a buffer for a priority group other than a certain priority group, provide notification that the data is remaining in the buffer for the priority group other than the certain priority group, without providing notification of a total amount of the data remaining in the buffer for the other priority group,
wherein the certain priority group is a priority group whose Buffer Status Report prohibit timer is not running, and
wherein the Buffer Status Report prohibit timer is started in response to an instruction from the radio base station.

4. A mobile station comprising:
a processor that manages priority groups each of which is a group of one or more priorities assigned to one or more data flows; and
a transmitter that notifies a radio base station of a total amount of data remaining in a buffer for a certain priority group,
wherein when data is remaining in a buffer for a priority group other than the certain priority group, the transmitter provides notification that the data is remaining in the buffer for the priority group other than the certain priority group, without providing notification of a total amount of data remaining in the buffer for the other priority group,
wherein the certain priority group is a priority group whose Buffer Status Report prohibit timer is not running, and
wherein a value of the Buffer Status Report prohibit timer is set independently for each of the priority groups.

5. A radio base station comprising:
a transmitter that transmits an instruction to a mobile station that provides notification of a total amount of data remaining in a buffer for each of priority groups which is a group of one or more priorities assigned to one or more data flows,
the instruction instructing the mobile station to, when data is remaining in a buffer for a priority group other than a certain priority group, provide notification that the data is remaining in the buffer for the priority group other than the certain priority group, without providing notification of a total amount of the data remaining in the buffer for the other priority group,
wherein the certain priority group is a priority group whose Buffer Status Report prohibit timer is not running, and
wherein a value of the Buffer Status Report prohibit timer is set independently for each of the priority groups.

* * * * *